Jan. 7, 1941.　　　C. J. HUGHEY　　　2,227,974
CAMERA LATCH
Filed Jan. 27, 1939
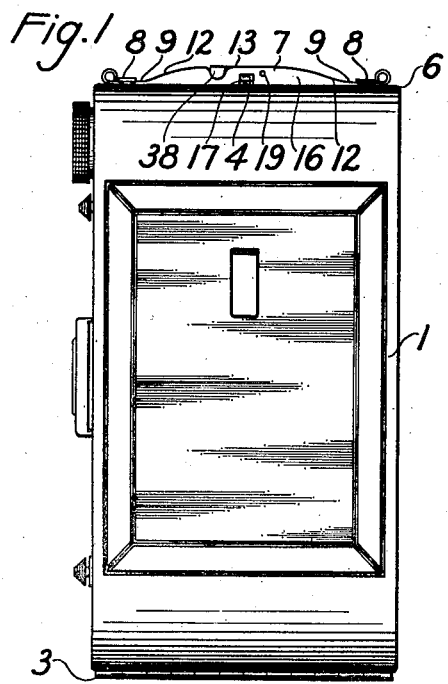
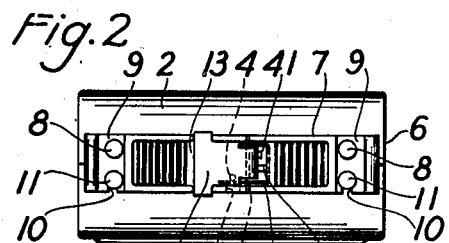
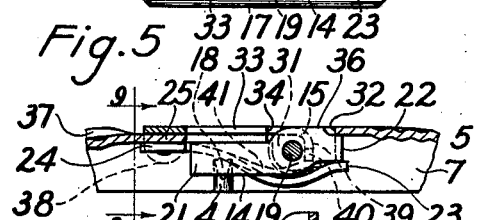
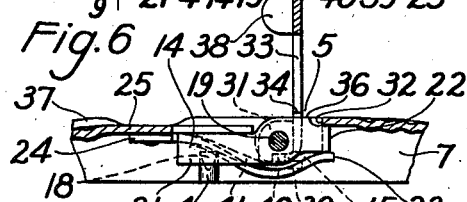
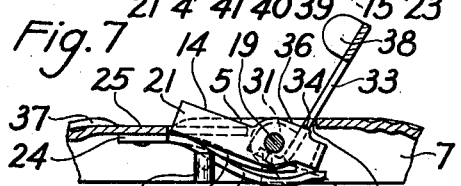
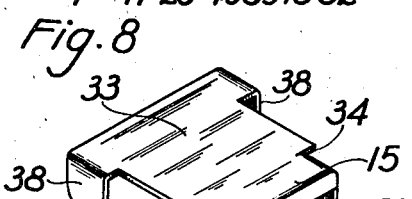
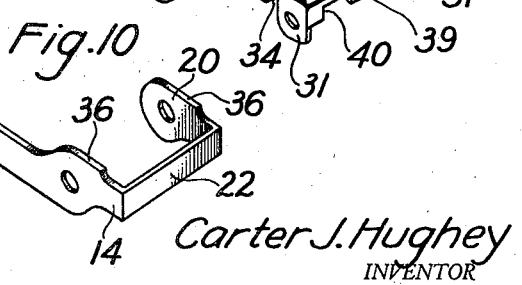
Carter J. Hughey
INVENTOR
BY
ATTORNEYS Patented Jan. 7, 1941

2,227,974

UNITED STATES PATENT OFFICE 2,227,974

CAMERA LATCH

Carter J. Hughey, Rochester, N. Y., assignor to Eastman Kodak Company, Rochester, N. Y., a corporation of New Jersey Application January 27, 1939, Serial No. 253,169

5 Claims. (Cl. 292—226)

The present invention relates to photography, and more particularly to a latch for photographic cameras.

This latch is an improvement in the one disclosed in U. S. Patent 2,043,903, A. Nagel, issued June 9, 1936. The camera latch disclosed in the above noted patent, as well as other latches of this general type, possesses the disadvantage that it is too easily opened accidentally. It has been found that people using cameras equipped with this type of latch very often attempt to pick the camera up by gripping the end equipped with the latch, and in so doing, accidentally grip the finger pieces of the latch member and raise the same to release the latch. The consequence of such action, as will be readily appreciated, is that the camera is opened, and if the same is loaded with film, a certain amount of the film becomes fogged. Although this latch shown in U. S. Patent 2,043,903, was particularly constructed so that the handle of the latch is almost wholly received within a recessed seat in the top of the housing for preventing accidental opening, it has been found that the accidental opening of this latch, by unintentionally gripping the finger pieces when attempting to pick the camera up by gripping the end thereof, or in carrying the camera by its end, is too frequent.

Therefore, the primary object of the present invention is to provide a latch of the type shown in U. S. 2,043,903 which cannot be opened accidentally even should the actuating member thereon be unintentionally actuated in picking up the camera by its end provided with the latch. Another object is to provide a latch of the type described wherein the latch proper and the actuating member therefor are separate elements, and which parts are arranged so that the actuating member must be moved through a given portion of its entire movement before engaging the latch member which is opened during the remainder of its movement. A further object is to provide a camera latch which is simple in construction, and which can be readily operated. And yet another object is to provide a camera latch which is positive in operation, and which will latch automatically as the two parts of the camera to be latched are brought together. Another object is to provide a camera latch which is neat in appearance, and which does not project out from the camera body.

The novel features that I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawing in which:

Fig. 1 is a front plan view of a camera provided with a latch constructed in accordance with and embodying a preferred form of my invention, Fig. 2 is a top plan view of the camera and the latch shown in Fig. 1.

Fig. 3 is an enlarged top plan view of a portion of the latch per se, showing the same in a latched position, but with the actuating member raised to a vertical position, at which point it engages the latch member, Fig. 4 is an enlarged plan view of the underside of the latch, with the parts in the same position as shown in Fig. 3, Fig. 5 is a longitudinal section of the latch taken on lines 5—5 of Fig. 9, Fig. 6 is a section taken on lines 6—6 of Fig. 3, Fig. 7 is a section corresponding to that of Fig. 6, but showing the actuating member moved to its latch releasing position, Fig. 8 is an enlarged perspective view of the latch actuating member removed from the camera, Fig. 9 is a section taken on line 9—9 of Fig. 5, and Fig. 10 is an enlarged perspective view of the latch member removed from the camera.

Like reference numerals refer to corresponding parts throughout the drawings.

It is customary in camera constructions to provide a camera bed which is movably mounted with respect to the camera body, the back either being removable from the camera body, or having a hinged connection therewith.

As a preferred embodiment of my invention, I have illustrated a camera body 1 as having a back 2 which is hingedly attached at 3 to the camera body, and which is provided with interengaging latch elements 4 and 5 by which the camera back may be locked in closed position relative to the camera body.

I prefer to form the latch so that it will be as inconspicuous as possible. Across one end 6 of the camera body 1 I provide a shallow housing 7 which encloses the latch mechanism. This shallow housing may be attached to the camera back by rivets 8 passing through extensions 9 integral with but extending from the end of the shallow housing. The longitudinal edge of the extensions 9 which overhang the edge of the camera body, when the camera body and camera back are in closed relation, may be provided with slots 10 for receiving pins 11 on the end of the camera body when the parts are brought together, see Figs. 1 and 2. This pin and slot arrangement serves to properly line up the camera body and camera back when the two parts are brought together, and aids in holding the camera back and camera body against any relative transverse movement which might come about due to twisting the camera body relative to the camera back.

The shallow housing 7 may be provided with tapering walls 12 leading up to a central area 13 in which the latch member 14 and the actuating member 15 therefor are mounted as will be fully described hereinafter. One of the side walls 16 of the housing 7 is provided with a small opening 17 of the size and shape to admit the passage therethrough of a pin 4 which forms one of the latching elements. As shown clearly in Figs. 5 and 9 this pin 4 is provided with a beveled top 18 which can engage and cam the latch member 14 about the pintle 19 so that the latch member 14 will spring over the pin 4 and will spring down again into the position shown in Fig. 9 for holding the parts together.

As shown in Figs. 4 and 10, the latch member 14 is U shaped and comprises a short flange 20, a long flange 21, each of said flanges connected by a cross piece 22. The flanges 20 and 21 are perforated for rotatably mounting the latch member 14 on the hinged pintle 19 extending transversely of the housing 7, and when the latch member is so mounted the long flange 21 thereof lies adjacent and parallel to the side wall 16 and is of sufficient length to extend across the opening 17 in said side wall. The latch member 14 is normally held in covering position relative to the opening 17 by the action of the spring finger 23 extending from the spring plate 24 which is fixed to the under side of the top 25 of the housing 7, said spring finger engaging the cross piece 22 of the latch member and normally tending to rotate the latch member counterclockwise, looking at Fig. 5, about the pintle 19.

Referring particularly to Figs. 5–8 the latch member is moved to its releasing position by an actuating member 15 also pivoted to the hinge pintle 19 by having said pintle extending through perforated downturned ears 31 at the end thereof. The ears 31 on the actuating member 15 are spaced apart a less distance than are the flanges 20 and 21 on the latch member so that the same are located inside of said flanges in the assembled position of the two parts on the hinged pintle 19. The actuating member 15 extends through an aperture 32 in the top 25 of the housing 7, and terminates in a handle portion 33 which extends slightly beyond the downturned ears 31 thereon to provide latch member engaging portions 34. When the actuating member 15 is in its folded position, see Figs. 5 and 9, the top surface of said actuating member and the edges 36 of the flanges 20 and 21 lie substantially flush with the top of the housing 7 to the right of the aperture 32 therein. Referring to Fig. 5 it will be noticed that the plane of the top of the housing to the right of the aperture 32 is raised slightly above the plane of that portion of the top to the left of the aperture to permit the actuating member and the latch member to assume a folded position wherein they will lie flush therewith. Therefore, in order to provide for a flat surface entirely across the top of the housing when the actuating member is folded down, that portion of the top to the left of the aperture 32 and including said aperture is provided with an upstanding beading 37, see Figs. 5–7, which beading is equal in height to the thickness of the actuating member 15.

Referring now to Fig. 2 it will be noticed that the top of the housing 7 is decorated with transverse corrugations and the entire edge appears to have a raised beading 37. Actually, however, the beading 37 surrounds the part of the top of the housing to the left of and including the aperture, as shown in Figs. 5–7, and the beading around the remainder of the top is flush with the top of the housing and is merely stamped around the edge thereof to carry out the design. The handle portion of the actuating member 15 includes transversely extending downturned ears 38 which, when the actuating member is in its folded position overhang the side walls of the housing and rests in depressions 39 formed in the beading 37 to the left of the aperture 32 to permit the actuating member to lie flush with the top of the housing when in its folded position. The actuating member can be easily gripped and raised by gripping these downturned ears 38 between two fingers.

Referring to Figs. 5, 6 and 7 consecutively, it will be noticed that the actuating member 15 is moved through 90 degrees before it engages or has any effect on the latch member 14. This is true because the end 39 of the actuating member is close to the pivot point thereof and does not engage the cross piece 22 of the latch member or the spring finger 23 in rotating to this position. The end 39 of the actuating member 15 is provided with a notch 40 which is in vertical alignment with the spring finger 23 for permitting said rotative movement of the actuating member should the spring tend to extend up into the path of said end 39. By providing this lost motion between the actuating member and the latch member, accidental operation of the latch incidental to moving the actuating member is eliminated.

Now to release the latch the actuating member 15 must be moved past its vertical position, shown in Fig. 6, to that position shown in Fig. 7, or approximately through 30 degrees more. In this latter movement of the latch member engaging surfaces 34 in the sides of the actuating member engage the edges 36 of the flanges 20 and 21 behind the pintle 19 and effect the rotation of said latch member about this pintle until the flange 21 uncovers the opening 17 to release the pin 4. Movement of the actuating member beyond its vertical position is normally opposed by the action of spring finger 41 extending from the spring plate 24, which spring finger engages the end 39 of said actuating member when it reaches its vertical position. In order to release the latch the actuating member must be moved to the position shown in Fig. 7 and held there while the pin 4 is removed from the opening 17, because if the actuating member were moved to this position and released the combined action of the spring fingers 23 and 41 would immediately snap the two parts to the position shown in Fig. 6 where the opening 17 would be covered. Movement of the latch member 14 to its latching position is stopped and determined by virtue of the cross piece 22 thereof engaging the under side of the top 25 of the housing 7 adjacent one end of the aperture 32 therein, as shown in Figs. 5 and 6.

This latch is operated in the following manner. When the latch is in the holding position, shown in Fig. 5, and the actuating member 15 is in folded position, the same possesses a neat appearance, and serves to decorate the end of the camera. In order to open the latch the actuating member 15 is first raised to the vertical position, shown in Fig. 6, by grasping a hold of the downturned ears 38 on the handle portion 33 thereof. This 90 degree movement of the actuating member has no effect whatever on the latch member 14, but is provided so as to eliminate accidental opening of the latch which might be incident to one grasping the same unintentionally in attempting to pick up the camera by its end. The latch is actually opened when the actuating member 15 is moved to the position shown in Fig. 7, or approximately 30 degrees past its vertical position. In moving the actuating member to this position the action of springs 23 and 41 must be overcome as the result of which the actuating member must be held in its releasing position until the pin 4 is removed from the opening 17. Release of the actuating member 15 allows the latch member 14 to snap back to its latching position under the action of spring 23, and allows the actuating member to snap back to its vertical position under the combined action of springs 23 and 41. With the latch in locking position the camera can be closed and latched by bringing the two parts together, because the beveled edge of the pin 4 will cam the latch member 14 upward to allow the pin to pass through the opening 17 and to the inside of flange 20 of the latch member 14.

It will be readily appreciated that my latch structure reduces or entirely eliminates the chance of accidental opening which is characteristic of latches of this type, and particularly the latch disclosed in U. S. Patent 2,043,903, A. Nagel, June 9, 1936, by providing a lost motion connection between the latch member proper of the latch and the actuating member therefor. It having been found that any accidental movement of the actuating member of the latch which might ensue to picking up the camera by gripping its end would not effect a movement of the actuating member past its vertical position, the latch has been designed so that such movement of the actuating member will not actuate the latch. Thus the disadvantages of known latches of this type are overcome. Further, the fact that my latch cannot remain in a released position without being manually held therein also serves to prevent accidental opening of the camera.

Although I have shown and described a certain specific embodiment of my invention, I am fully aware that many modifications thereof are possible. My invention, therefore, is not to be restricted except in so far as is necessitated by the prior art and by the spirit of the appended claims.

Having thus described my invention, what I claim is new and desire to secure by Letters Patent of the United States is:

1. In a latch adapted for use with cameras having two relatively movable parts with a pin on one of said parts, the combination of a housing on said second part and including top and side walls one of which side walls is provided with an opening to receive said pin, a latch member pivotally mounted in said housing to move in a plane adjacent and parallel to said side wall provided with said opening and between a latching position wherein it covers said opening, and an unlatching position wherein it uncovers said opening, a spring normally holding said latch member in said latching position, and an actuating member pivotally mounted in said housing for engaging and moving said latch member, and including a handle extending through the top of said housing and adapted to lie flush with said top when in a folded position, an ear on said handle adapted to overhang one of the side walls of said housing when said handle is in a folded position and to permit the same to be raised from said position, said actuating member and handle capable of a given arcuate movement prior to said member engaging said latch member, and capable of a further arcuate movement during which said actuating member engages and moves said latch member to its unlatching position.

2. In a latch adapted for use with cameras having two relatively movable parts with a pin on one of said parts, the combination of a housing on said second part and including top and side walls one of said side walls provided with an opening to receive said pin, a latch member pivotally mounted in said housing to move between a latching position wherein it covers said opening, and an unlatching position wherein it uncovers said opening, a spring normally holding said latch member in said latching position, and an actuating member pivotally mounted in said housing for a given arc of movement, and adapted after being moved through a portion of said given arc of movement to engage and move said latch member to its unlatching position during movement through the remainder of said given arc of movement, said actuating member including a handle portion extending through an opening in said top wall of the housing, and adapted to be flat on said top wall when said actuating member is moved to the end of its given arc of movement where it does not engage said latch member and a leaf spring attached at one end to the underside of the top of said housing and the free end thereof adapted to lie in a position to engage and resist movement of said actuating member prior to the instant in the arcuate movement thereof that said member engages said latch member, and for normally returning said actuating member to this position in its arc of movement upon release thereof.

3. In a latch adapted for use with cameras having two relatively movable parts with a pin on one of said parts, the combination of a housing on said second part and including top and side walls, one of said side walls provided with an opening to receive said pin, a latch member pivotally mounted in said housing to move between a latching position wherein it covers said opening, and an unlatching position wherein it uncovers said opening, a spring member normally holding said latch member in said latching position, and an actuating member pivotally mounted in said housing for engaging and moving said latch member, and including a handle extending through the top of said housing and adapted to lie flat against the top of said housing when in a folded position, said actuating member and handle capable of arcuate movement greater than 90°, and adapted to move through 90° of movement from said folded position before said actuating member engages said latch member to move the same.

4. In a latch adapted for use with cameras having two relatively movable parts with a pin on one of said parts, the combination of a housing on said second part and including top and side walls, one of said side walls provided with an opening to receive said pin, a latch member pivotally mounted in said housing to move between a latching position wherein it covers said opening, and an unlatching position wherein it uncovers said opening, a spring member normally holding said latch member in said latching position, an actuating member pivotally mounted in said housing for engaging and moving said latch member, and including a handle extending through the top of said housing and adapted to lie flat against the top of said housing when in a folded position, said actuating member and handle capable of arcuate movement greater than 90° and adapted to move through 90° of movement from said folded position before said actuating member engages said latch member to move the same, and a spring member in said housing adapted to engage said actuating member when the same has moved through 90° of its movement for resisting further movement thereof.

5. In a latch adapted for use with cameras having two relatively movable parts with a pin on one of said parts, the combination of a housing on said second part and including top and side walls provided with an opening to receive said pin, a hinge pintle extending transversely of said housing, a latch member pivotally mounted in said housing on said pintle and including a flange parallel and adjacent to said side wall having the opening, and adapted to engage and hold said pin inside of said housing, a spring normally holding said latch member in its latching position, an actuating member pivoted on said pintle and capable of movement through an arc greater than 90°, said actuating member including a latch member engaging portion adapted to engage said flange after said actuating member has moved through 90° of its movement, whereupon further movement of said actuating member effects movement of said latch member to its unlatching position, a spring for engaging said actuating member prior to its engagement with said latch member and for resisting further movement of said actuating member, and a handle portion contiguous with said actuating member extending through an opening in the top of said housing, and adapted to lie flat on said top when said actuating member is at one extreme end of its path of movement.

CARTER J. HUGHEY.